Figure 1:
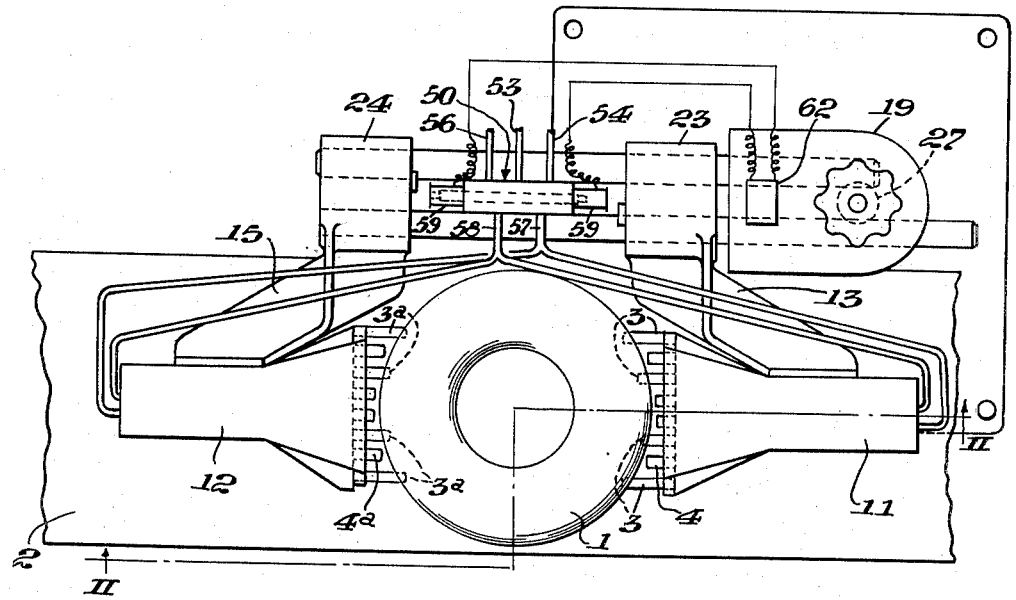

Dec. 2 1952     J. C. BONGIOVANNI     2,620,076
APPARATUS FOR UNPILING POTTERY WARE
Filed Sept. 28, 1948     3 Sheets-Sheet 1

INVENTOR.
JOHN C. BONGIOVANNI.
BY
Brown, Critchlow, Flick & Peckham
his
ATTORNEYS.

Dec. 2 1952  J. C. BONGIOVANNI  2,620,076
APPARATUS FOR UNPILING POTTERY WARE
Filed Sept. 28, 1948  3 Sheets-Sheet 2

INVENTOR.
JOHN C. BONGIOVANNI.
BY
Brown, Critchlow, Flick & Peckham
his ATTORNEYS Dec. 2 1952 J. C. BONGIOVANNI 2,620,076
APPARATUS FOR UNPILING POTTERY WARE
Filed Sept. 28, 1948 3 Sheets-Sheet 3
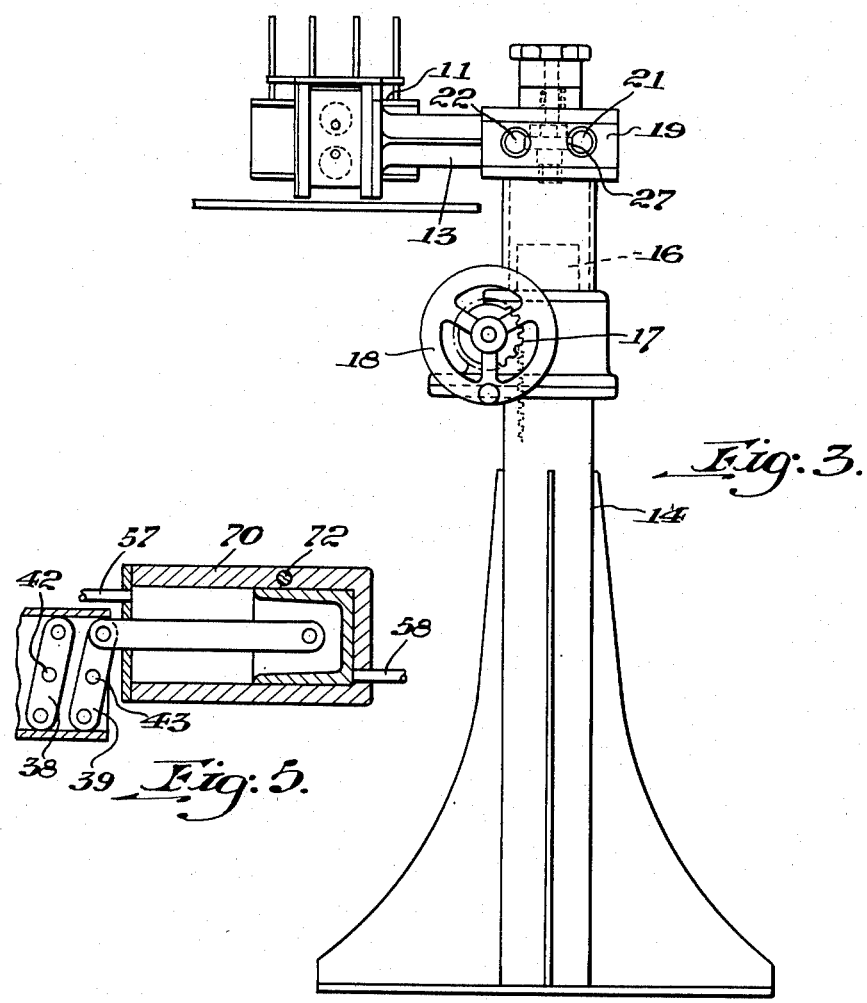
INVENTOR.
JOHN C. BONGIOVANNI.
BY
Brown, Critchlow, Flick & Peckham
his ATTORNEYS.

Patented Dec. 2, 1952

2,620,076

UNITED STATES PATENT OFFICE 2,620,076

APPARATUS FOR UNPILING POTTERY WARE

John C. Bongiovanni, Sewickley, Pa., assignor to The Edwin M. Knowles China Company, Newell, W. Va., a corporation of West Virginia Application September 28, 1948, Serial No. 51,586

11 Claims. (Cl. 214—8.5)

This invention relates to machines for handling pottery ware and, in particular, to apparatus for dispensing pottery ware piece-by-piece from the bottom of a pile thereof upon a conveyor.

In the manufacture of pottery ware there are a number of operations from which the ware is delivered in piles or stacks and it becomes necessary to place the ware piece-by-piece upon a conveyor on which it is carried while undergoing a subsequent operation, such as brushing, glazing, etc. Usually, this unpiling is performed by hand which not only is relatively slow but also requires two or more workers, all of which reduces the efficiency and increases the expense of the manufacture. Also, in at least one step of the manufacturing operations, this being when the piles of ware arrive from the bisk kiln, the pieces in the pile may be stuck together so that additional unnecessary time and energy must be spent in manually separating them.

It is therefore an object of the invention to provide apparatus which is capable of automatically separating pieces of piled pottery ware and of quickly dispensing the pile piece-by-piece upon a traveling conveyor.

Another object is to provide such automatic unpiling apparatus in which the rate of delivery of the pieces of ware to the conveyor can be varied while, at the same time, the speed of the movement of the separating and dispensing members is kept constant.

Further objects are to provide apparatus in accordance with the above objects which is sturdy, compact, relatively inexpensive and unusually economical to operate.

According to the invention, the apparatus includes a pair of oppositely disposed, horizontally reciprocable arms each of which carries, preferably at its inner ends, a plurality of ware-engaging fingers. A second pair of similarly disposed and reciprocable finger-bearing arms also are provided, the fingers of this pair being spaced above the fingers of the first pair a distance approximately equal to the vertical distance between the edges of adjacent pieces of ware in the pile. The lower or first-mentioned fingers normally extend beneath and support the pile, and means are provided to actuate the arms and fingers so as to dispense the ware piece-by-piece upon a conveyor. This actuating means effects a series of operations that include (1) moving the first-mentioned lower arms outwardly to withdraw their supporting fingers from beneath the pile, (2) simultaneously moving the second-named upper arms inwardly to project their fingers beneath the second piece of ware from the bottom of the pile to provide temporary support for the pile while the released bottom piece drops onto the conveyor, and (3) thereafter moving the arms in the reverse of movements (1) and (2) so that the lower, first-mentioned fingers return to support the pile and the upper fingers return to their laterally withdrawn position. Aside from this dispensing action, the movement (2) in which the upper fingers are projected beneath the second lowest piece of the pile, has the additional functions of positively separating and freeing the bottom piece when it is stuck to the piece above it.

Preferably the actuating power is provided by a pair of pneumatically actuated motors arranged in an oppositely disposed position with relation to a pile of ware so that their pistons reciprocate horizontally towards and away from each other. Most suitably, each motor has a single piston that is connected to an arm of one of the pairs of arms at each side of the pile, and the other pair of arms is linked to this connected, or driven, pair in such a manner that the finger movements described are effected. However, if desired, each motor may be provided with a pair of pistons so that each of the arms can be connected directly to a piston. It, also, is preferable to provide a timing mechanism by which the intervals between reciprocations can be varied to suit the speed of the conveyor. However, for each reciprocation the fingers move quickly and at a speed that is unaffected by adjustments in the frequency of the piston reciprocations.

Figure 4:
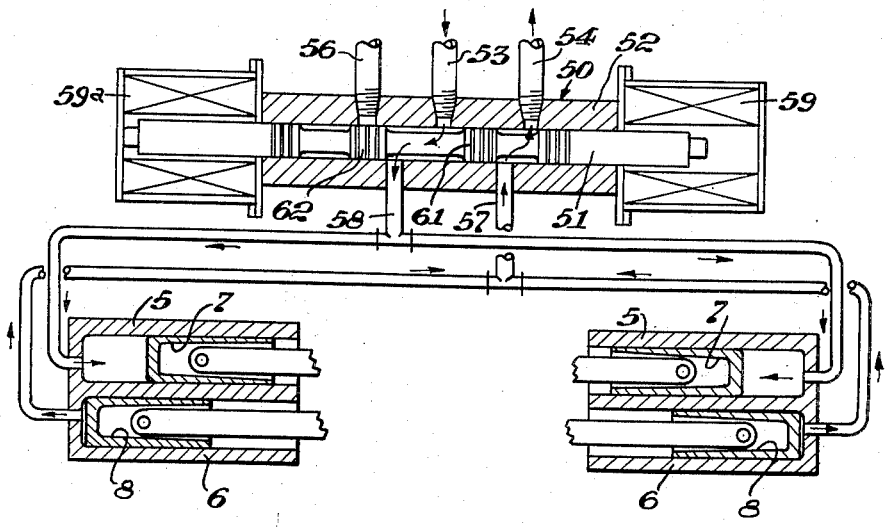
Figure 2:
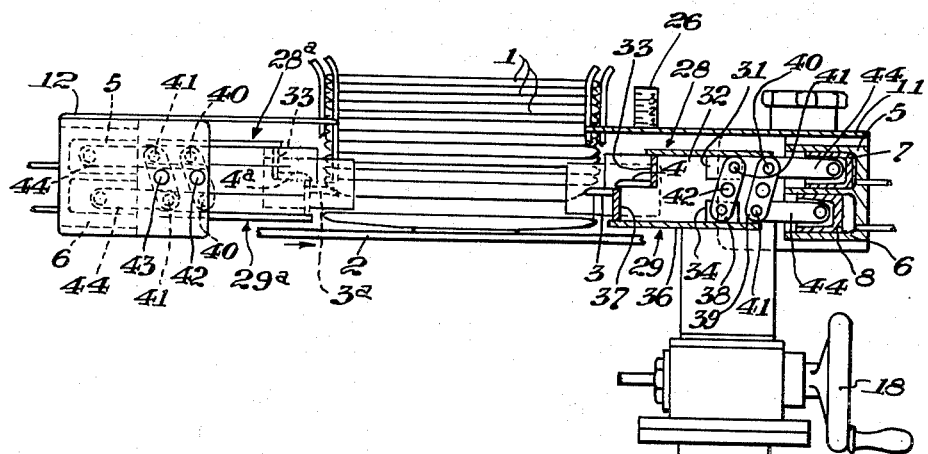

The preferred embodiment of the invention is illustrated in the accompanying drawings of which Fig. 1 is a plan view of the apparatus; Fig. 2 a section on line II—II of Fig. 1; Fig. 3 a right-hand end view or elevation of the apparatus; Fig. 4 a much enlarged, slightly diagrammatic sectional view of a suitable control valve associated with pneumatic motors which are at a relatively smaller scale; Fig. 5 a fragmentary sectional view showing a modified form of the apparatus in which each pneumatically actuated motor has but a single cylinder and piston; and Figs. 6, 7, and 8 schematic drawings illustrating the dispensing action of the mechanism.

Referring to Figs. 1 and 2 of the drawings, the apparatus is shown loaded with a pile of plates 1 which are held over a traveling conveyor 2 by groups of oppositely disposed, horizontally reciprocable fingers 3 and 3a which engage the bottom of the lowest piece in the pile. It should be understood at this point that the drawings merely illustrate one manner in which the apparatus can be used and that it is equally suitable for other uses. Thus, instead of depositing the ware on a belt conveyor, it may be desired in some potteries to deposit it upon a rotary table, or the like, and the use of the word "conveyor" is intended to include such other tables. Also, the ware may be handled in an inverted position in which case it is intended that the downwardly facing side of each piece be considered as its bottom side. Further, the word "potteryware" as used in this description and the claims should be given a broad meaning that would include such items as "setters" on which potteryware is carried when in a green state.

Spaced above fingers 3 and 3a a distance approximately equal to the vertical distance between the edges of the plates in the pile, is another group oppositely disposed, horizontally reciprocable fingers 4 and 4a. Each group of fingers is connected, in a manner to be described, to the pistons of a pair of oppositely disposed motors each of these motors including an upper and a lower cylinder 5 and 6 and upper and lower pistons 7 and 8, the upper group of fingers being connected to upper pistons 7 and the lower groups to lower pistons 8. Support for the cylinders is provided by box-like frame structures 11 and 12 carried one at each side of the apparatus by rigid beam members 13 and 15. The beam members, in turn, are supported by a structure that permits the box-like frames and their fingers to be moved up and down as well as forward and away from each other so as to compensate for the different sizes of ware being formed.

The principal supporting member which holds the fingers in an elevated position overhanging the conveyor is a pedestal 14 in which a shaft 16 (Fig. 3) is telescopically mounted. The purpose of this telescoped shaft is to permit vertical adjustment of the fingers and, as shown, the shaft is provided at one side with rack teeth which mesh with teeth of a pinion 17 that is rotated by a handwheel 18. Rigidly secured to the upper portion of the shaft is a rack bar bearing member 19 that is provided with a pair of parallel, horizontal openings in which are slidably mounted a pair of elongate rack bars 21 and 22 (Fig. 3). The support for the bars is provided by this bearing member and also by enlarged portions 23 and 24 of the two beam members 13 and 15 through which the bars project. As is apparent, to raise or lower the fingers, it is only necessary to rotate the handwheel which moves the telescoping shaft up or down. Preferably, an index arm 26 is secured to the pedestal for the purpose of indicating to the operator the particular height at which the apparatus is set.

The movement of the fingers toward and away from each other for adjusting their positions to act on dinnerware of different diameters is achieved by securing each one of the rack bars to a separate one of enlarged beam portions 23 and 24. Also, another pinion 27 is provided which is positioned centrally between the rack bars and is meshed with their teeth. Rack bar 21 is secured to the right-hand enlarged beam portion 24, so that, when the ratchet wheel is rotated by means of any suitable hand wheel, the bars move in opposite directions and carry the finger supporting beams in opposite directions toward or away from each other.

The groups of fingers, which as has been stated are pneumatically reciprocated so as to dispense the ware piece-by-piece, are carried, as shown best in Fig. 2, by pairs of upper and lower arms 28, 28a and 29, 29a that, in turn, are linked to the pistons. Upper arms 28 and 28a are each formed with a pair of side walls 31 and a top wall 32, and the fingers preferably are detachably mounted in lug 33 extending downwardly from the inner ends of the top wall. Also, each of the lower arms 29 and 29a has upwardly extending side walls 34, a base 36, and extending upwardly from the base a lug 37 which carries these lower fingers. The fingers are wedge shape to facilitate their sliding in beneath the plates or like circular dinnerware being dispensed and, also, they are graduated in size so as to fit under the peripheral edge of circular ware. In addition, any number of fingers may be used, the number that is used depending upon the particular size and shape of the ware being dispensed. At their inner ends, upper and lower arms 28 and 29 are linked together by a pair of inner and outer pivotal links 38 and 39, each of these links being connected to short pins 40 and 41 mounted in side walls of the arms. The links are pivoted on fixed pivot pins 42 and 43 which are carried in the side walls of the box-like frame structure.

The arms, as stated, are connected to the pistons and for this purpose, specially formed pistons are provided. Thus, upper and lower pistons 7 and 8 are cup-like in shape, and each pivotally carries a short connecting rod 44 that pivotally engages a short pin mounted in the wall of the piston. The connections of upper and lower arms 28 and 29 to their pistons is made with these short connecting rods, the rods engaging outer link pins 41 that are carried by the arms. The necessity for using such pivotal piston-connecting rods is that as the pistons reciprocate, they swing the arms about their fixed pivot pins 42 and 43 so that the piston-connecting rods must swing in following that movement. As will be seen, the linkage of the arms to the pistons and to each other is the same at the left-hand side of the apparatus, Fig. 2 as at the right.

The pneumatic pressure for driving the pistons is supplied through a control valve 50 which is constructed so as to supply the pressure alternately to the upper and lower cylinders 5 and 6. The particular valve illustrated in Figs. 1 and 4 is one that has been simplified for purposes of illustration, and it will be understood that there are numerous types of commercial valves which would serve the purpose at least as well. Referring to Fig. 4, the valve includes a stem 51 mounted in a casing 52 which is provided with a single inlet line 53 and a pair of exhaust ports 54 and 56 positioned on either side of the inlet. Leading through the casing from the opposite side of the inlet and exhausts are another pair of pipes 57 and 58 which, a short distance from the casing, divide and lead to cylinders at the opposite sides of the apparatus, pipe 57 leading to lower cylinders 6 and the other pipe 58 to the upper cylinders 5. Valve stem 51 is slidably mounted in the casing and reciprocates in response to energization of solenoids 59 and 59a carried one at each end of casing 52. Also, the valve stem is provided with valve seats 61 and 62 so spaced with respect to the inlets and exhausts of the casing that the pressure flows alternately through one or the other air conduits 57 and 58. Thus, in the position in which the valve is shown in Fig. 4, pressure will flow as indicated by the arrows to the upper cylinders 5 from inlet 53 through the central portion of casing 52 and through conduit 58, and simultaneously, the lower cylinders 6 being exhausted through the conduits indicated, this being through conduit 51, the right hand portion of casing 53 and through exhaust 54. When the valve stem is reciprocated to the left, the valve seats come to such a position that the flow is opposite to that indicated in Fig. 4. As has been stated, such a valve is well known and should need no further detailed description.

The reciprocations of the valve stem are controlled by a timing mechanism 62 (Fig. 1) which is electrically connected to the solenoids and which operates to alternately energize them. Such timing mechanism also is well known commercially and should need no detailed description. However, the use of such mechanism is an important feature of the invention since it permits the frequency of reciprocations of the finger-actuating pistons, and therefore the dispensing of pieces of ware from a pile to be varied to suit the speed of travel of the conveyor.

Figure 6:
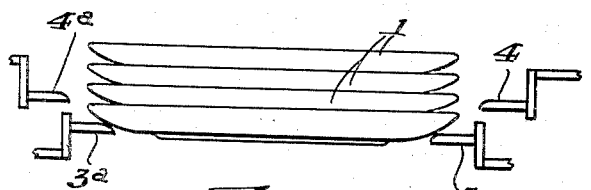
Figure 7:
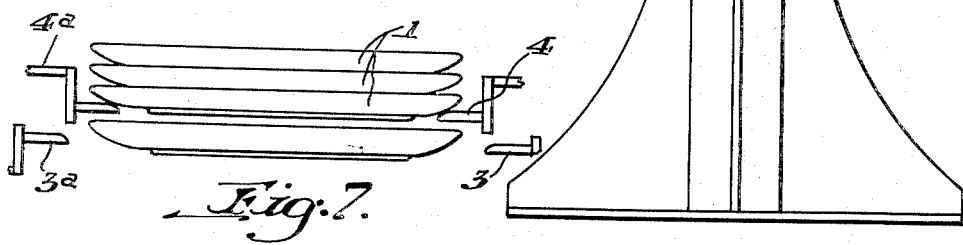
Figure 8:
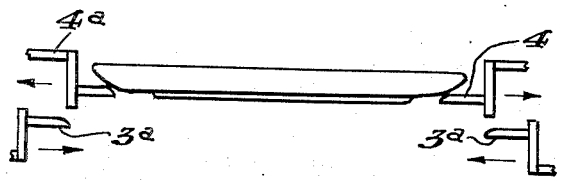

The operation of the apparatus is schematically illustrated in Figs. 6, 7 and 8. With the control valve energizing current on and the air pressure built up, the first step in the operation carries the pressure through the control valve to reciprocate the upper pistons 7 in the manner shown in Fig. 4. This causes the upper fingers 4 and 4a to move inwardly toward the pile of plates and, because of the described linkage, the lower fingers 3 and 3a move outwardly, thereby releasing the bottom plate which drops onto the conveyor and is carried away. This dispensing position of the fingers is shown in Fig. 7 and the pile is then supported by the upper fingers 4. The next energization of the control valve reciprocates the valve stem thereby actuating the lower pistons and causing the lower fingers to move into pile-supporting position. Simultaneously, the upper fingers move away from the pile and permit it to drop onto the lower fingers. In each dispensing cycle the movements of the fingers are quite rapid, and also, in each timed cycle the finger movements shown in Figs. 7 and 8 follow in quite close sequence, the valve timer being constructed so as to achieve this. The cycles, of course, are repeated by successive energizations of the control valve solenoids until each of the plates have been deposited on the conveyor and carried away.

It will be noted from the above description that the speed at which the fingers move is independent of the rate or frequency of piston reciprocations and, in fact, is dependent entirely upon the pneumatic pressure and the manner in which the finger-carrying arms are linked. It is desirable to adjust this linkage so that the fingers will move rapidly, such high speed reducing the possibility of the pile being dropped and also, permitting a rapid dispensing. With the linkage shown, dispensing speeds can be obtained which are far more rapid than the customary manual dealing out of plates. However, the arrangement is such that the frequency of the reciprocations can be reduced and this rapid speed of movement of the fingers retained and this is accomplished by different settings of the timing mechanism. Thus, if a relatively slow conveyor is being used, the frequency of reciprocation can be reduced accordingly. However, regardless of the speed at which the ware is dispensed, a real advantage of the apparatus resides in the fact that it is automatic and avoids the necessity of manual labor.

Another important feature mentioned above, is that as the fingers move from the position shown in Fig. 6 to that of Fig. 7, the upper fingers wedge in between the lower two plates and, if they should happen to be stuck together, as often happens when the pile is delivered from the bisque kiln, this wedging positively separates these two plates. A further advantage lies in the adaptability of the apparatus for use in dispensing various sizes and shapes of ware. Thus, for example, adjustments can be made for handling either large dinner plates or small saucers. To adapt the apparatus for handling saucers, it is only necessary to move the fingers closer together by moving pinion 27 which, as described, moves the fingers toward each other. Also, vertical adjustments can be made by rotating pinion 17 and, if necessary, other suitable sizes and shapes of the fingers may be substituted. These adjustments can be made quickly so that there is little loss of time in converting the machine for manufacturing the many types of wares customarily manufactured in a plant. Also, it is simple, light, sturdy and relatively inexpensive.

As will be understood, various modifications are possible without altering the basic functioning of the apparatus. One such modification, shown in Fig. 5, consists primarily in substituting a single cylinder 70 for the upper and lower of each pair of cylinders shown in Figs. 2 and 4. The linkage of the piston of such a single cylinder is substantially the same as that formerly described except that outer arm-connecting-links 39 are not connected at their lower portion to a piston-connecting rod. Another difference in this modification is that it is desirable to mount the cylinders within their box-like frame on pivot pins 72. This is so, because the swing of arm-connecting-links 38 and 39 about their fixed pivot pins 42 and 43 will cause the cylinder to swing. The control valve previously described and shown in Fig. 4 also is suitable for use with this modification except that one of the lines leading to the cylinder enters through its front wall so that the piston can be positively reciprocated in both directions. The advantages of the single cylinder of this modification lie principally in the fact that its piston can be better sealed so that there will be smaller losses of air pressure. This and other modifications which will occur to those skilled in this art are within the contemplation of the invention.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An apparatus for dispensing potteryware piece-by-piece from the bottom of a pile thereof upon a conveyor, comprising a pair of oppositely-disposed horizontally-reciprocable arms each provided with a plurality of fingers for engaging the bottom of the lowest piece of such pile and thereby supporting the pile, a second pair of oppositely-disposed horizontally-reciprocable arms each provided with a plurality of fingers spaced above said first-named fingers approximately the vertical distance between the edges of adjacent pieces of ware in the pile, and a pair of pneumatically-actuated reciprocating motors each connected to one element of one of said pairs of arms, the other pair of arms each being linked to its vertically adjacent motor connected arm, said linkage being such that said motor reciprocations (1) move said first-named arms outwardly to withdraw their fingers from beneath the pile and (2) simultaneously move said second-named arms inwardly to project their fingers beneath the second piece of ware from the bottom of the pile temporarily to support the pile while the bottom piece drops therefrom and (3) thereafter move said arms in the reverse of said movements (1) and (2) whereby the fingers of the first-mentioned arms are positioned to support the pile of ware and the fingers of the second-mentioned arms are withdrawn laterally therefrom.

2. An apparatus for dispensing potteryware piece-by-piece from the bottom of a pile thereof upon a conveyor, comprising a pair of oppositely-disposed horizontally-reciprocable arms each provided with a plurality of fingers for engaging the bottom of the lowest piece of such pile and thereby supporting the pile, a second pair of oppositely-disposed horizontally-reciprocable arms each provided with a plurality of fingers spaced above said first-named fingers approximately the vertical distance between the edges of adjacent pieces of ware in the pile, a pair of pneumatically actuated reciprocating motors each connected to one element of one of said pairs of arms, the other pair of arms each being linked to its vertically adjacent, motor-connected arm, said linkage being such that said motor reciprocations (1) move said first-named arms outwardly to withdraw their fingers from beneath the pile and (2) simultaneously move said second-named arms inwardly to project their fingers beneath the second piece of ware from the bottom of the pile temporarily to support the pile while the bottom piece drops therefrom and (3) thereafter move said arms in the reverse of said movements (1) and (2) whereby the fingers of the first-mentioned arms are positioned to support the pile of ware and the fingers of the second-mentioned arms are withdrawn laterally therefrom, and timing mechanism for varying the rate of reciprocation of said motors to suit the speed of said conveyor.

3. An apparatus for dispensing potteryware piece-by-piece from the bottom of a pile thereof upon a conveyor, comprising a pair of oppositely-disposed horizontally-reciprocable arms each carrying at its inner end a plurality of fingers for engaging the bottom of the lowest piece of such pile and thereby supporting the pile, a second pair of oppositely-disposed horizontally-reciprocable arms each carrying a plurality of fingers spaced above said first-named fingers approximately the vertical distance between the edges of adjacent pieces of ware in a pile, and a pair of pneumatically actuated motors having oppositely-disposed, horizontally-reciprocable piston members, each of the arms of said second pair being linked at its outer end to its adjacent piston and each of the arms of said first-mentioned pair being connected by a pivotal link to the vertically adjacent arm of said second pair, whereby reciprocation of said pistons (1) moves said first-named arms outwardly to withdraw their fingers from beneath the pile and (2) simultaneously moves said second-named arms inwardly to project their fingers beneath the second piece of ware from the bottom of the pile temporarily to support the pile while the bottom piece drops therefrom and (3) thereafter moves said arms in the reverse of said movements (1) and (2), the fingers of the first-mentioned arms thereby being withdrawn laterally therefrom.

4. An apparatus for dispensing potteryware piece-by-piece from the bottom of a pile thereof upon a conveyor, comprising a pair of oppositely-disposed horizontally-reciprocable arms each provided with a plurality of fingers for engaging the bottom of the lowest piece of such pile and thereby supporting the pile, a second pair of oppositely-disposed horizontally-reciprocable arms each provided with a plurality of fingers spaced above said first-named fingers approximately the vertical distance between the edges of adjacent pieces of ware in the pile, vertically and horizontally adjustable supporting structure for suspending said arms over said conveyor, and a pair of pneumatically-actuated reciprocating motors each connected to one element of one of said pairs of arms, the other pair of arms each being linked to its vertically adjacent motor-connected arm, said linkage being such that said motor reciprocations (1) move said first-named arms outwardly to withdraw their fingers from beneath the pile and (2) simultaneously move said second-named arms inwardly to project their fingers beneath the second piece of ware from the bottom of the pile temporarily to support the pile while the bottom piece drops therefrom and (3) thereafter move said arms in the reverse of said movements (1) and (2) whereby the fingers of the first-mentioned arms are positioned to support the pile of ware and the fingers of the second-mentioned arms are withdrawn laterally therefrom.

5. An apparatus for dispensing potteryware piece-by-piece from the bottom of a pile thereof upon a conveyor, comprising a pair of oppositely-disposed horizontally-reciprocable arms each provided with a plurality of fingers for engaging the bottom of the lowest piece of such pile and thereby supporting the pile, a second pair of oppositely-disposed horizontally-reciprocable arms each provided with a plurality of fingers spaced above said first-named fingers approximately the vertical distance between the edges of adjacent pieces of ware in the pile, vertically and horizontally adjustable supporting structure for suspending said arms over said conveyor, a pair of pneumatically-actuated reciprocating motors each connected to one element of one of said pairs of arms, the other pair of arms each being linked to its vertically adjacent motor-connected arm, said linkage being such that said motor reciprocations (1) move said first-named arms outwardly to withdraw their fingers from beneath the pile and (2) simultaneously move said second-named arms inwardly to project their fingers beneath the second piece of ware from the bottom of the pile temporarily to support the pile while the bottom piece drops therefrom and (3) thereafter move said arms in the reverse of said movements (1) and (2) whereby the fingers of the first-mentioned arms are positioned to support the pile of ware and the fingers of the second-mentioned arms are withdrawn laterally therefrom, and timing mechanism for varying the rate of reciprocation of said motors to suit the speed of said conveyor.

6. An apparatus for dispensing potteryware piece-by-piece from the bottom of a pile thereof upon a conveyor, comprising a pedestal, a toothed shaft telescopically mounted in said pedestal, a pinion meshed with said shaft for adjusting it vertically, a supporting frame rigidly carried by said shaft, groups of oppositely-disposed fingers for engaging the lowest piece of ware in said pile and thereby supporting the pile, a finger-supporting member for each of said groups, finger-actuating mechanism for moving certain groups of said fingers away from and others into said pile engagement whereupon said lowest piece drops freely onto said conveyor, said finger-supporting members each being connected to one of a pair of rack bars slidably carried in said frame, and a pinion disposed centrally between said bars and meshed therewith for laterally adjusting said finger supporting members to and from each other, said vertical and lateral adjustments being for the purpose of bringing said fingers into a proper position for supporting and dispensing different sizes and shapes of ware.

7. An apparatus for dispensing potteryware piece-by-piece from the bottom of a pile thereof upon a conveyor, comprising a pair of oppositely-disposed horizontally-reciprocable arms each provided with a plurality of fingers for engaging the bottom of the lowest piece of such pile and thereby supporting the pile, a second pair of oppositely-disposed horizontally-reciprocable arms each provided with a plurality of fingers spaced above said first-named fingers approximately the vertical distance between the edges of adjacent pieces of ware in the pile, links connecting said second pair of arms to said first-named pair of arms, and a pair of reciprocating motors each connected to an element of one of said pair of arms, said linkage being such that said motor reciprocations (1) move said first-named arms outwardly to withdraw their fingers from beneath the pile and (2) simultaneously move said second-named arms inwardly to project their fingers beneath the second piece of ware from the bottom of the pile temporarily to support the pile while the bottom piece drops therefrom and (3) thereafter move said arms in the reverse of said movements (1) and (2) whereby the fingers of the first-mentioned arms are positioned to support the pile of ware and the fingers of the second-mentioned arms are withdrawn laterally therefrom.

8. An apparatus for dispensing potteryware piece-by-piece from the bottom of a pile thereof upon a conveyor, comprising a pair of oppositely-disposed horizontally-reciprocable arms each provided with a plurality of fingers for engaging the bottom of the lowest piece of such pile and thereby supporting the pile, a second pair of oppositely-disposed horizontally-reciprocable arms each provided with a plurality of fingers spaced above said first-named fingers approximately the vertical distance between the edges of adjacent pieces of ware in the pile, links connecting said second pair of arms to said first-named pair of arms, and a pair of reciprocating motors having oppositely-disposed horizontally-reciprocable pistons, each of the arms of one of said pairs of arms being connected at its outer end to its adjacent piston, said arm linkage being such that said motor reciprocations (1) move said first-named arms outwardly to withdraw their fingers from beneath the pile and (2) simultaneously move said second-named arms inwardly to project their fingers beneath the second piece of ware from the bottom of the pile temporarily to support the pile while the bottom piece drops therefrom and (3) thereafter move said arms in the reverse of said movements (1) and (2) whereby the fingers of the first-mentioned arms are positioned to support the pile of ware and the fingers of the second-mentioned arms are withdrawn laterally therefrom.

9. An apparatus for dispensing potteryware piece-by-piece from the bottom of a pile thereof upon a conveyor, comprising a pair of oppositely-disposed horizontally-reciprocable arms each provided with a plurality of fingers for engaging the bottom of the lowest piece of such pile and thereby supporting the pile, a second pair of oppositely-disposed horizontally-reciprocable arms each provided with a plurality of fingers spaced above said first-named fingers approximately the vertical distance between the edges of adjacent pieces of ware in the pile, a pair of reciprocating motors each having upper and lower horizontally-reciprocable pistons, said upper pistons being connected to said second pair of arms and said lower pistons to the first-named pair of arms, and links interconnecting said second and said first-named pairs of arms, said linkage being such that said motor reciprocations (1) move said first-named arms outwardly to withdraw their fingers from beneath the pile and (2) simultaneously move said second-named arms inwardly to project their fingers beneath the second piece of ware from the bottom of the pile temporarily to support the pile while the bottom piece drops therefrom and (3) thereafter move said arms in the reverse of said movements (1) and (2) whereby the fingers of the first-mentioned arms are positioned to support the pile of ware and the fingers of the second-mentioned arms are withdrawn laterally therefrom.

10. An apparatus for dispensing potteryware piece-by-piece from the bottom of a pile thereof upon a conveyor, comprising a pair of oppositely-disposed horizontally-reciprocable arms each provided with a plurality of fingers for engaging the bottom of the lowest piece of such pile and thereby supporting the pile, a second pair of oppositely-disposed horizontally-reciprocable arms each provided with a plurality of fingers spaced above said first-named fingers approximately the vertical distance between the edges of adjacent pieces of ware in the pile, links connecting said second pair of arms to said first-named pair of arms, a pair of reciprocating motors each connected to an element of one of said pair of arms, said linkage being such that said motor reciprocations (1) move said first-named arms outwardly to withdraw their fingers from beneath the pile and (2) simultaneously move said second-named arms inwardly to project their fingers beneath the second piece of ware from the bottom of the pile temporarily to support the pile while the bottom piece drops therefrom and (3) thereafter move said arms in the reverse of said movements (1) and (2) whereby the fingers of the first-mentioned arms are positioned to support the pile of ware and the fingers of the second-mentioned arms are withdrawn laterally therefrom, and timing mechanism for varying the rate of reciprocation of said motors to suit the speed of said conveyor.

11. An apparatus for dispensing potteryware piece-by-piece from the bottom of a pile thereof upon a conveyor, comprising a pair of oppositely-disposed horizontally-reciprocable arms each provided with a plurality of fingers for engaging the bottom of the lowest piece of such pile and thereby supporting the pile, a second pair of oppositely-disposed horizontally-reciprocable arms each provided with a plurality of fingers spaced above said first-named fingers approximately the vertical distance between the edges of adjacent pieces of ware in the pile, links connecting said second pair of arms to said first-named pair of arms, a pair of reciprocating motors having oppositely-disposed horizontally-reciprocable pistons, each of the arms of one of said pairs of arms being connected at its outer end to its adjacent piston, said arm linkage being such that said motor reciprocations (1) move said first-named arms outwardly to withdraw their fingers from beneath the pile and (2) simultaneously move said second-named arms inwardly to project their fingers beneath the second piece of ware from the bottom of the pile temporarily to support the pile while the bottom piece drops therefrom and (3) thereafter move said arms in the reverse of said movements (1) and (2) whereby the fingers of the first-mentioned arms are positioned to support the pile of ware and the fingers of the second-mentioned arms are withdrawn laterally therefrom, and timing mechanism for varying the rate of reciprocation of said motors to suit the speed of said conveyor.

JOHN C. BONGIOVANNI.

REFERENCES CITED

The following references are of record in the file of this patent:

UNITED STATES PATENTS

| Number | Name | Date |
|---|---|---|
| 994,456 | Gray | June 6, 1911 |
| 1,158,045 | Graham | Oct. 26, 1915 |
| 1,649,365 | Poling et al. | Nov. 15, 1927 |
| 1,962,872 | Moon | June 12, 1934 |
| 2,237,659 | Edwards | Apr. 8, 1941 |
| 2,317,408 | Schneider | Apr. 27, 1943 |
| 2,578,760 | Strickland, Jr. | Dec. 18, 1951 |